US011391956B2

(12) United States Patent
Lee

(10) Patent No.: US 11,391,956 B2
(45) Date of Patent: Jul. 19, 2022

(54) METHOD AND APPARATUS FOR PROVIDING AUGMENTED REALITY (AR) OBJECT TO USER

(71) Applicant: SAMSUNG ELECTRONICS CO., LTD., Suwon-si (KR)

(72) Inventor: Seok Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/039,329

(22) Filed: Sep. 30, 2020

(65) Prior Publication Data

US 2021/0199981 A1 Jul. 1, 2021

(30) Foreign Application Priority Data

Dec. 30, 2019 (KR) .................. 10-2019-0177961

(51) Int. Cl.
*G02B 27/01* (2006.01)
*B60K 35/00* (2006.01)
*G06F 3/01* (2006.01)

(52) U.S. Cl.
CPC .......... *G02B 27/0179* (2013.01); *B60K 35/00* (2013.01); *G06F 3/013* (2013.01); *B60K 2370/177* (2019.05); *G02B 2027/0181* (2013.01); *G02B 2027/0183* (2013.01); *G02B 2027/0187* (2013.01)

(58) Field of Classification Search
CPC ........ G02B 27/0179; G02B 2027/0181; G02B 2027/0187; G02B 2027/0183; G02B 2027/0093; G02B 2027/0138; B60K 2370/1529; B60K 2370/177; B60K 2370/736; B60K 35/00; G06F 3/013; G06F 3/011

See application file for complete search history.

(56) References Cited

U.S. PATENT DOCUMENTS

| | | | |
|---|---|---|---|
| 2013/0141250 A1 | 6/2013 | Mathieu et al. | |
| 2016/0325683 A1* | 11/2016 | Hayashi | H04N 13/279 |
| 2017/0161949 A1 | 6/2017 | Seder et al. | |
| 2017/0323482 A1 | 11/2017 | Coup et al. | |
| 2017/0329143 A1* | 11/2017 | Svarichevsky | G03H 1/2294 |
| 2018/0031849 A1 | 2/2018 | Omanovic et al. | |

(Continued)

FOREIGN PATENT DOCUMENTS

| | | |
|---|---|---|
| JP | 2016-147532 A | 8/2016 |
| KR | 10-2018-0026418 A | 3/2018 |

(Continued)

*Primary Examiner* — Xuemei Zheng
(74) *Attorney, Agent, or Firm* — Sughrue Mion, PLLC

(57) ABSTRACT

A method for providing an augmented reality (AR) object to a user includes determining a left image and a right image to provide an AR object to a user of a vehicle; generating eye information of the user based on an image of the user that is obtained; measuring an acceleration of the vehicle using an inertial measurement unit; predicting a target position of the user a preset time period after the image of the user is obtained, based on the acceleration and the eye information; generating a panel image by rendering the left image and the right image based on the predicted target position; and providing the AR object to the user by outputting the panel image through a head-up display (HUD) system of the vehicle.

19 Claims, 11 Drawing Sheets

(56) References Cited

U.S. PATENT DOCUMENTS

2019/0023524 A1   1/2019  Lalumandier et al.
2021/0020145 A1*  1/2021  Hirata ..................... G09G 5/38

FOREIGN PATENT DOCUMENTS

| KR | 10-2019-0070665 A | 6/2019 |
| WO | 2018/145958 A1 | 8/2018 |
| WO | 2018/146048 A1 | 8/2018 |

* cited by examiner

METHOD AND APPARATUS FOR PROVIDING AUGMENTED REALITY (AR) OBJECT TO USER

CROSS-REFERENCE TO RELATED APPLICATION

This application claims priority from Korean Patent Application No. 10-2019-0177961, filed on Dec. 30, 2019 in the Korean Intellectual Property Office, the disclosure of which is incorporated by reference herein in its entirety.

BACKGROUND

1. Field

Methods and apparatuses consistent with example embodiments relate to technology for providing an augmented reality (AR) object to a user, and more particularly, to technology for providing the AR object using an acceleration of a vehicle.

2. Description of Related Art

A head-up display (HUD) system may generate a virtual image in front of a driver and display information in the virtual image, thereby providing the user with a variety of information. The information provided to the driver may include, for example, navigation information and dashboard information such as a vehicle velocity, a fuel level, and an engine revolutions per minute (RPM). The driver may more easily recognize the information displayed directly in front of the driver without turning his or her gaze during driving, and thus, driving safety may improve. In addition to the navigation information and the dashboard information, the HUD system may also provide the driver with, for example, a lane indicator, a construction indicator, an accident indicator, or a pedestrian detection indicator using augmented reality (AR), to assist with driving when a field of view is inadequate.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a method of providing an augmented reality (AR) object, the method including: determining a left image and a right image to provide an AR object to a user of a vehicle; generating eye information of the user based on an image of the user that is obtained; measuring an acceleration of the vehicle using an inertial measurement unit; predicting a target position of the user a preset time period after the image of the user is obtained, based on the acceleration and the eye information; generating a panel image by rendering the left image and the right image based on the predicted target position; and providing the AR object to the user by outputting the panel image through a head-up display (HUD) system of the vehicle.

The determining of the left image and the right image may include: sensing a surrounding environment of the vehicle using one or more sensors; determining the AR object based on the sensed surrounding environment; and determining the left image and the right image with respect to the AR object.

The generating of the eye information of the user may include: obtaining the image of the user using a camera of the HUD system; and generating the eye information based on the image of the user.

The eye information may include relative position information between the HUD system and both eyes of the user.

The predicting of the target position of the user may include: determining a position variation of the vehicle after the preset time period based on the acceleration; and determining the target position of the user based on the position variation of the vehicle, wherein the position variation of the vehicle may include a difference between a first position of the vehicle at a start of the preset time period and a second position of the vehicle at an end of the preset time period.

The determining of the target position of the user based on the position variation of the vehicle may include: determining respective position variations of the vehicle with respect to a plurality of perpendicular axes; determining respective compensation ratios for each of the plurality of perpendicular axes based on the respective position variations of the vehicle; and determining the target position based on the compensation ratios for each of the plurality of perpendicular axes.

The generating of the panel image may include generating the panel image using at least one parameter with respect to the HUD system.

The preset time period corresponds to a difference between a first point in time at which the eye information is generated and a second point in time at which the panel image is output.

The method may further include: determining an inertial navigation system (INS) position of the vehicle based on the acceleration; determining a global positioning system (GPS) position of the vehicle using a GPS; and determining a position of the vehicle based on the INS position and the GPS position, wherein the position of the vehicle is used to determine the AR object provided to the user of the vehicle.

The method may further include: determining whether the measured acceleration is greater than or equal to a preset threshold value; and providing a planar image to the user as the AR object through the HUD system of the vehicle in response to the measured acceleration being greater than or equal to the preset threshold value.

According to an aspect of an example embodiment, there is provided a non-transitory computer-readable storage medium storing instructions that, when executed by a processor, cause the processor to perform the method.

According to an aspect of an example embodiment, there is provided an electronic device including: a memory configured to store a program to provide an augmented reality (AR) object to a user of a vehicle; and a processor configured to execute the program to: determine a left image and a right image to provide an AR object to the user, generate eye information of the user based on an image of the user that is obtained, measure an acceleration of the vehicle using an inertial measurement unit, predict a target position of the user a preset time period after the image of the user is obtained, based on the acceleration and the eye information, generate a panel image by rendering the left image and the right image based on the predicted target position, and provide the AR object to the user by outputting the panel image through a head-up display (HUD) system of the vehicle.

The processor may be further configured to execute the program to: obtain the image of the user using a camera of the HUD system, and generate the eye information based on the image of the user.

The eye information may include relative position information between the HUD system and both eyes of the user.

The processor is further configured to execute the program to: determine a position variation of the vehicle after the preset time period based on the acceleration, and determine the target position based on the position variation of the vehicle, and wherein the position variation of the vehicle may include a difference between a first position of the vehicle at a start of the preset time period and a second position of the vehicle at an end of the preset time period.

The processor may be further configured to execute the program to: determine the position variation of the vehicle with respect to a plurality of perpendicular axes; determine respective compensation ratios for each of the plurality of perpendicular axes based on the respective position variations of the vehicle; and determine the target position based on the determined compensation ratios for each of the plurality of perpendicular axes.

The preset time period may correspond to a difference between a first point in time at which the eye information is generated and a second point in time at which the panel image is output.

The processor may be further configured to execute the program to: determine whether the measured acceleration is greater than or equal to a preset threshold value; and provide a planar image to the user as the AR object through the HUD system of the vehicle in response to the measured acceleration being greater than or equal to the preset threshold value.

The electronic device may be included in the vehicle.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
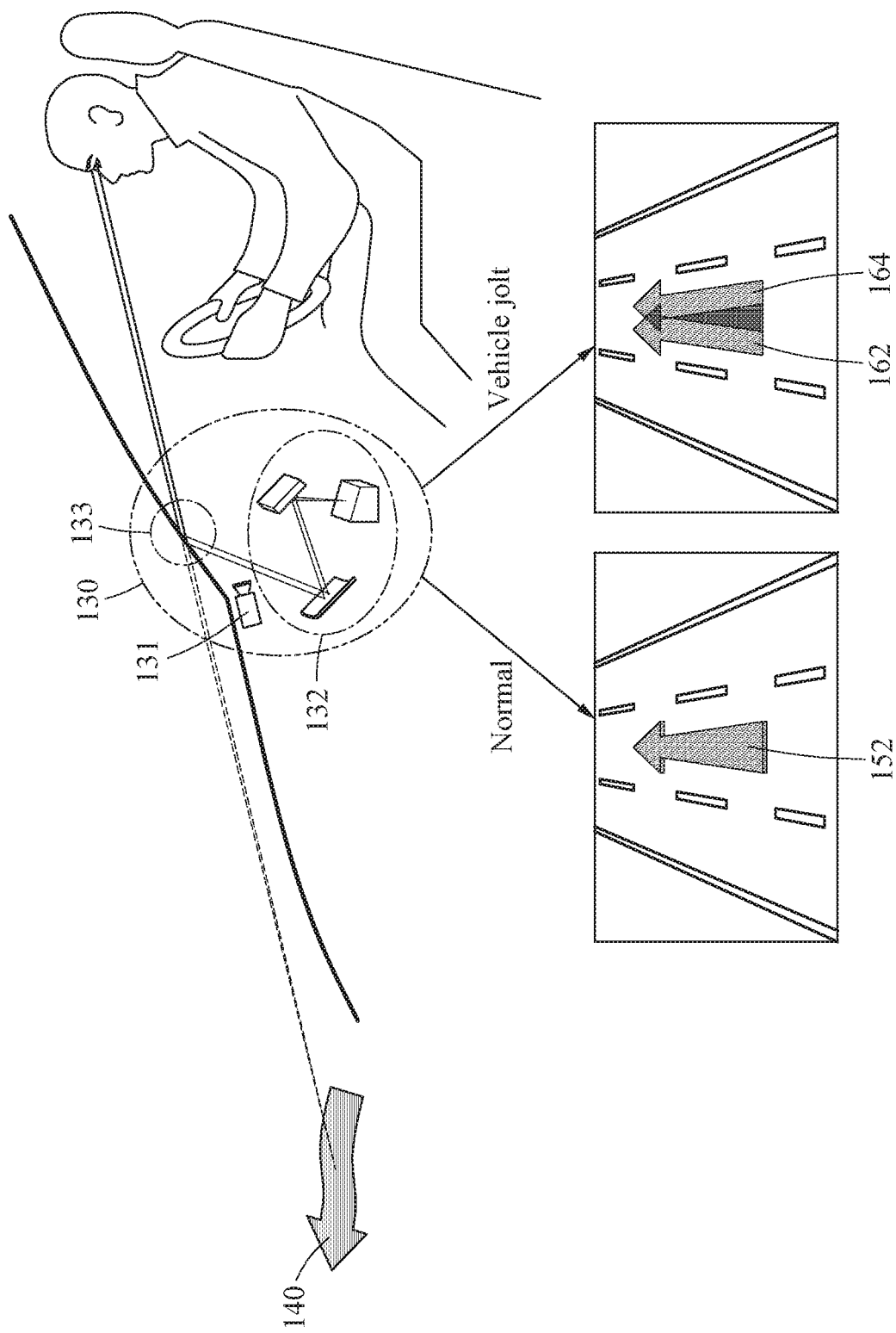
FIG. 1 illustrates a method of providing an augmented reality (AR) object to a user through a head-up display (HUD) system according to an example embodiment.

Hereinafter, example embodiments will be described in detail with reference to the accompanying drawings. The scope of the disclosure, however, should not be construed as limited to the example embodiments set forth herein. Like reference numerals in the drawings refer to like elements throughout the disclosure.

Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms are intended to include the plural forms as well, unless the context clearly indicates otherwise. It will be further understood that the terms "comprise", "comprising," "include", and "including", when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the disclosure.

FIG. 1 illustrates a method of providing an augmented reality (AR) object to a user through a head-up display (HUD) system according to an example embodiment.

An AR object 140 may be provided to a user 120 through a HUD system 130 of a vehicle 110. For example, when the HUD system 130 outputs stereo images respectively to the left eye and the right eye of the user 120, the user 120 may view the three-dimensional (3D) AR object 140 through the stereo images.

The HUD system 130 may include a camera 131 used to capture an image of the user 120, a HUD device 132, and a windshield 133. The HUD device 132 and the windshield 133 may form an optical system to provide rendered images to the eyes of the user 120. The user 120 may view the AR object 140 represented on a virtual screen based on light reflected by the windshield 133 that reaches the user's eyes. The virtual screen may be formed outside of the vehicle by the optical system, and the user 120 may view, through the virtual screen, the AR object 140 overlaid on a scene that the user 120 is viewing. For example, any one or more of dashboard information, navigation information, a lane indicator, a construction indicator, an accident indicator, or a pedestrian detection indicator may be provided through AR objects.

To provide the AR object 140 through the HUD system 130, a large representation image and a wide field of view (FOV) are required. In general, the representation image and the FOV are affected by the size of the HUD system 130. However, since only a limited space is available in a dashboard of the vehicle 110, it may be difficult to increase the size of the HUD system 130 to secure a sufficiently large representation image and a sufficiently wide FOV.

A display configured to output an image and an optical element configured to enlarge and reflect the image may be disposed at separate positions in the HUD device 132. Thus, a space occupied by the existing HUD device 132 in the dashboard may be minimized. Further, when a distance between the display and the optical element increases, the display may be miniaturized, and a large screen and a wide FOV may be achieved as effects of an increase in projection distance.

The HUD system 130 may provide the AR object 140 to be viewed by the user. A virtual object represented at a relatively short distance away from the user and a real object at a relatively long distance may not be viewed clearly at the same time, and the virtual object may not be represented at an accurate position using a two-dimensional (2D) AR object due to a disparity between the left eye and the right eye. A 3D AR object may represent a predetermined depth and provide different images to each eye, and may thus be suitable for AR implementation. The HUD system 130 may represent the virtual object at an accurate position through 3D AR.

To accurately provide the 3D AR object 140 to the user 120, the position of the user (for example, the positions of the left eye and the right eye) should be determined accurately. For example, the position of the user may be represented as a relative position of the user to the position of the HUD system 130.

An image on the lower left side of FIG. 1 shows an example in which the user 120 views a 3D AR object 152 when the position of the user 120 is determined accurately, at a point in time at which the AR object is output.

An image on the lower right side of FIG. 1 shows an example in which the user 120 views two images 162 and 164 of an AR object when the position of the user 120 is determined inaccurately, at a point in time at which the AR object is output. Such cross-talk (X-talk) may occur if the position of the user changes from the determined position at the point in time at which the AR object is actually output.

The example in which the position of the user 120 changes may include, for example, an example in which the position of the user 120 changes due to an accelerated movement of the vehicle 110, an example in which the vehicle 110 is shaken due to the surface condition of the road, and an example in which the user 120 is out of the FOV of the camera. If the velocity of the vehicle 110 increases or decreases, the user 120 may be moved by a force produced by the increase or decrease, which causes a change in the relative displacement between the position of the vehicle 110 and the position of the user 120.

Even when the vehicle 110 is shaken, if it is possible to accurately predict the position of the user 120 at a point in time at which the AR object is to be output, the AR object 140 may be accurately provided to the user 120.

Hereinafter, a method of predicting the position of the user 120 and providing the AR object 140 based on the predicted position of the user 120 will be described further below with reference to FIGS. 2 through 13.

Figure 2:
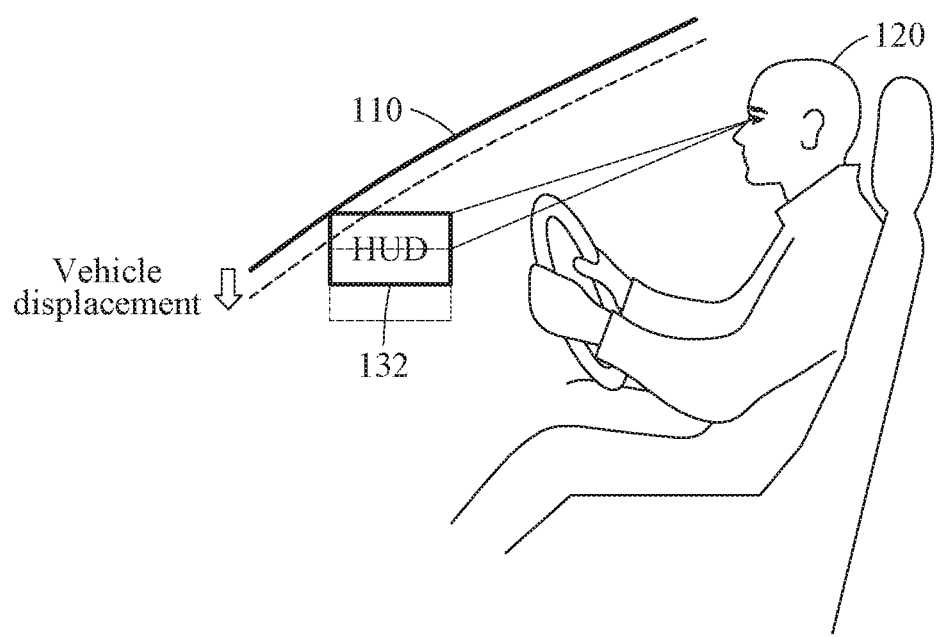
FIG. 2 illustrates a relative displacement between a vehicle and a user with respect to a displacement of the vehicle according to an example embodiment.

FIG. 2 illustrates a relative displacement between a vehicle and a user with respect to a displacement of the vehicle according to an example embodiment.

When the shape of the road on which the vehicle 110 travels causes the vehicle 110 to suddenly accelerate in a downward direction, the position of the vehicle 110 changes instantaneously from a position indicated by a solid line to a position indicated by a broken line. On the contrary, the position of the user 120 may change relatively less than the change in the position of the vehicle 110. Due to such a difference, the relative displacement between the position of the vehicle 110 and the position of the user 120 changes.

In the state where the relative displacement is changed, if a rendered 3D AR object is output based on information obtained before the relative displacement is changed, the user 120 may not view the 3D AR object accurately due to a change in eye position.

To prevent such a situation, the position of the user 120 at a point in time at which the AR object is output may be predicted. An acceleration of the vehicle 110 may be measured using an inertial measurement unit (IMU), the position of the vehicle 110 may be calculated based on the measured acceleration, and the position of the user 120 may be predicted based on the calculated position of the vehicle 110.

Figure 3:
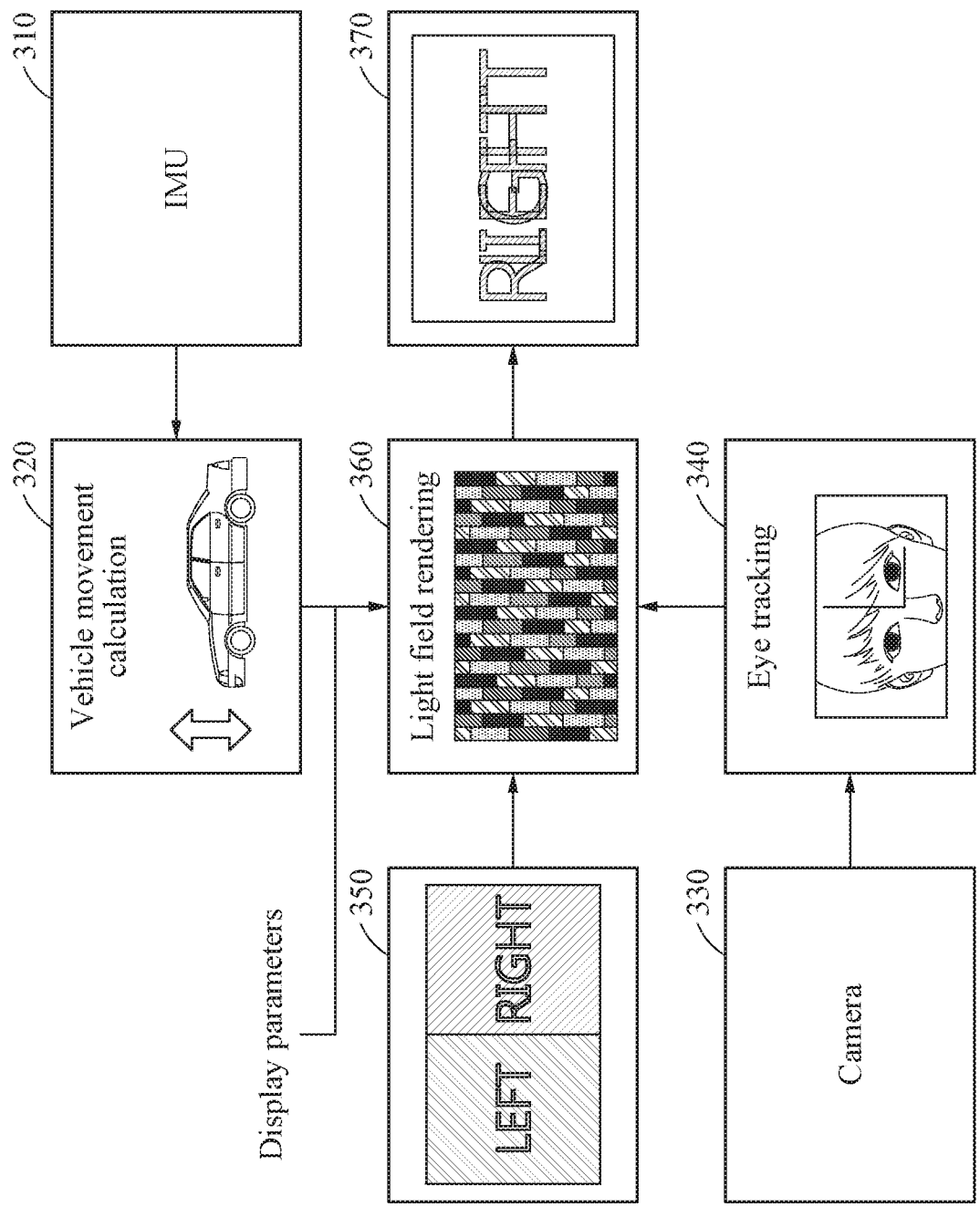
FIG. 3 is a block diagram illustrating a method of providing an AR object to a user based on a vehicle movement calculated using an inertial measurement unit (IMU) according to an example embodiment.

FIG. 3 is a block diagram illustrating a method of providing an AR object to a user based on a vehicle movement calculated using an IMU according to an example embodiment.

In block 310, an acceleration of a vehicle is measured using an IMU.

In block 320, a movement of the vehicle or a position of the vehicle after a preset time period is calculated based on the measured acceleration of the vehicle. A point in time after the preset time period may be a point in time at which an AR object is to be output.

In block 330, a user image is generated by capturing an image of a user using a camera.

In block 340, the eyes of the user are tracked by detecting both eyes of the user in the user image.

In block 350, a left image and a right image (for example, stereo images) for the AR object are determined.

In block 360, the positions of the eyes of the user after the preset time period may be determined, and a panel image may be generated by rendering the stereo images such that the AR object is output at the positions of the eyes determined based on display parameters.

In block 370, the AR object may be provided to the user by outputting the panel image. The AR object provided may be viewed three-dimensionally.

Hereinafter, the description related to blocks 310 to 370 will be provided further with reference to FIGS. 4 through 13.

Figure 4:
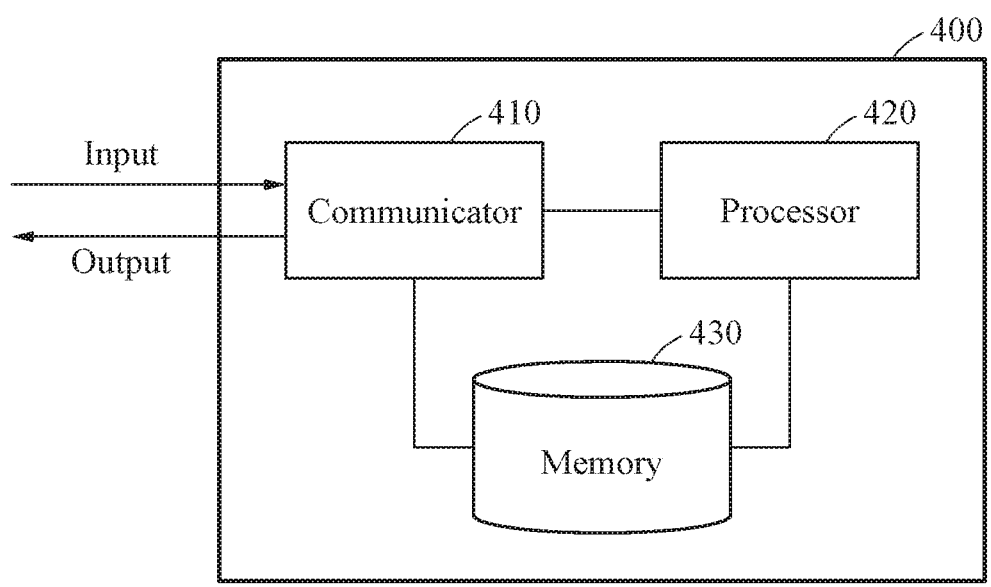
FIG. 4 illustrates a configuration of an electronic device according to an example embodiment.

FIG. 4 illustrates a configuration of an electronic device according to an example embodiment.

An electronic device 400 includes a communicator 410, a processor 420, and a memory 430. For example, the electronic device 400 may be included in the HUD system 130 of FIG. 1, or may be a device that controls the HUD system 130.

The communicator 410 is connected to the processor 420 and the memory 430 and transmits and receives data to and from the processor 420 and the memory 430. The communicator 410 may be connected to another external device and transmit and receive data to and from the external device. Hereinafter, transmitting and receiving "A" may refer to transmitting and receiving "information or data indicating A".

The communicator 410 may be implemented as circuitry in the electronic device 400. For example, the communicator 410 may include an internal bus and an external bus. In another example, the communicator 410 may be an element that connects the electronic device 400 to the external device. The communicator 410 may be an interface. The communicator 410 may receive data from the external device and transmit the data to the processor 420 and the memory 430.

The processor 420 processes the data received by the communicator 410 and data stored in the memory 430. The "processor" may be a data processing device implemented by hardware including a circuit having a physical structure to perform desired operations. For example, the desired operations may include instructions or codes included in a program. For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The processor 420 executes a computer-readable code (for example, software) stored in a memory (for example, the memory 430) and instructions triggered by the processor 420.

The memory 430 stores the data received by the communicator 410 and data processed by the processor 420. For example, the memory 430 may store the program (or an application, or software). The stored program may be a set of syntaxes that are coded and executable by the processor 420 to provide an AR object to a user.

The memory 430 may include, for example, at least one of volatile memory, non-volatile memory, random-access memory (RAM), flash memory, a hard disk drive, and an optical disk drive.

The memory 430 may store an instruction set (for example, software) for operating the electronic device 400. The instruction set for operating the electronic device 400 is executed by the processor 420.

The communicator 410, the processor 420, and the memory 430 will be described further below with reference to FIGS. 5 through 13.

Figure 5:
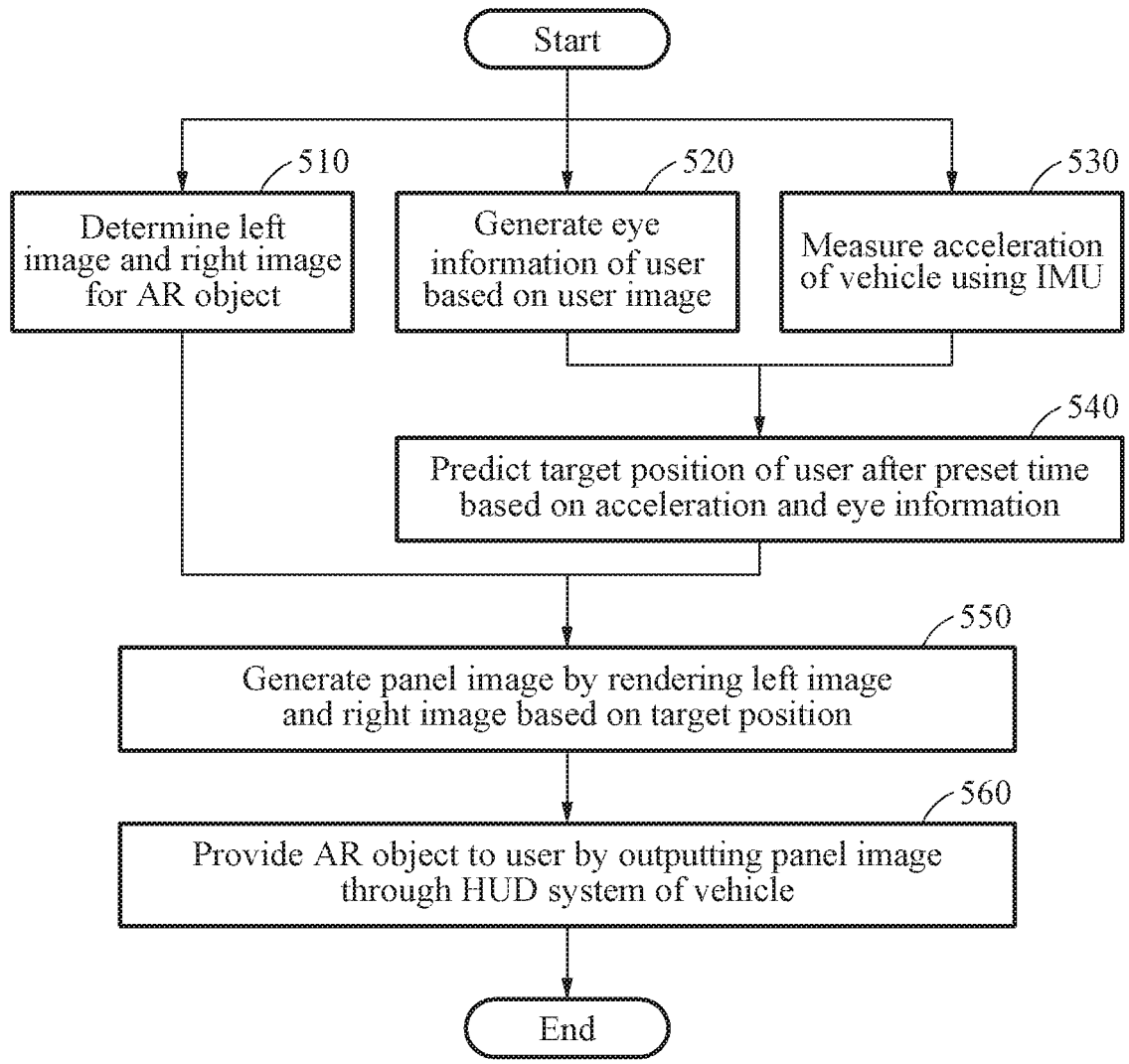
FIG. 5 is a flowchart illustrating a method of providing an AR object according to an example embodiment.

FIG. 5 is a flowchart illustrating a method of providing an AR object according to an example embodiment.

Operations 510 through 560 described below are performed by the electronic device 400 of FIG. 4.

In operation 510, the electronic device 400 determines a left image and a right image for an AR object. The left image and the right image are stereo images that represent the same object. The AR object may be determined first before the left image and the right image are determined. An example of determining the AR object will be described further below with reference to FIG. 6.

In operation 520, the electronic device 400 generates eye information of a user based on a user image. The eye information includes a position of the left eye and a position of the right eye in the user image. For example, the position of the left eye and the position of the right eye are coordinates of a coordinate system which is based on a HUD system or coordinates of a coordinate system which is based on a preset position in a vehicle. An example of generating the eye information of the user will be described further below with reference to FIG. 7.

In operation 530, the electronic device 400 measures an acceleration of the vehicle using an IMU of the vehicle. The IMU may include any one or more of accelerometers and gyroscopes and measures accelerations with respect to three axes using the accelerometers and the gyroscopes.

In operation 540, the electronic device 400 predicts a position of the user after a preset time period based on the acceleration and the eye information. The predicted position of the user may be a relative position of the user with respect to the position of the vehicle. For example, the preset time period may correspond to a difference between a point in time at which the eye information is generated and a point in time at which a panel image, which will be described later in operation 550, is to be output. That is, the position of the user at the point in time at which the panel image is to be output may be predicted. The predicted position of the user after the preset time period will be referred to as the target position.

An example of predicting the target position of the user will be described further below with reference to FIGS. 8 through 10.

In operation 550, the electronic device 400 generates a panel image by rendering the left image and the right image based on the predicted target position of the user. The panel image may be generated based on at least one display parameter with respect to a display of a HUD device or the HUD system. For example, the display parameter may include a slanted angle, a barrier pitch, a start position, and a thickness.

In operation 560, the electronic device 400 provides an AR object to the user by outputting the panel image through the HUD system of the vehicle. The panel image is an image rendered in view of the position of the user at the point in time at which the panel image is output (i.e., the target position) and thus, may accurately provide the left image and the right image to both eyes of the user, such that the user may view the 3D AR object through the left image and the right image.

Figure 6:
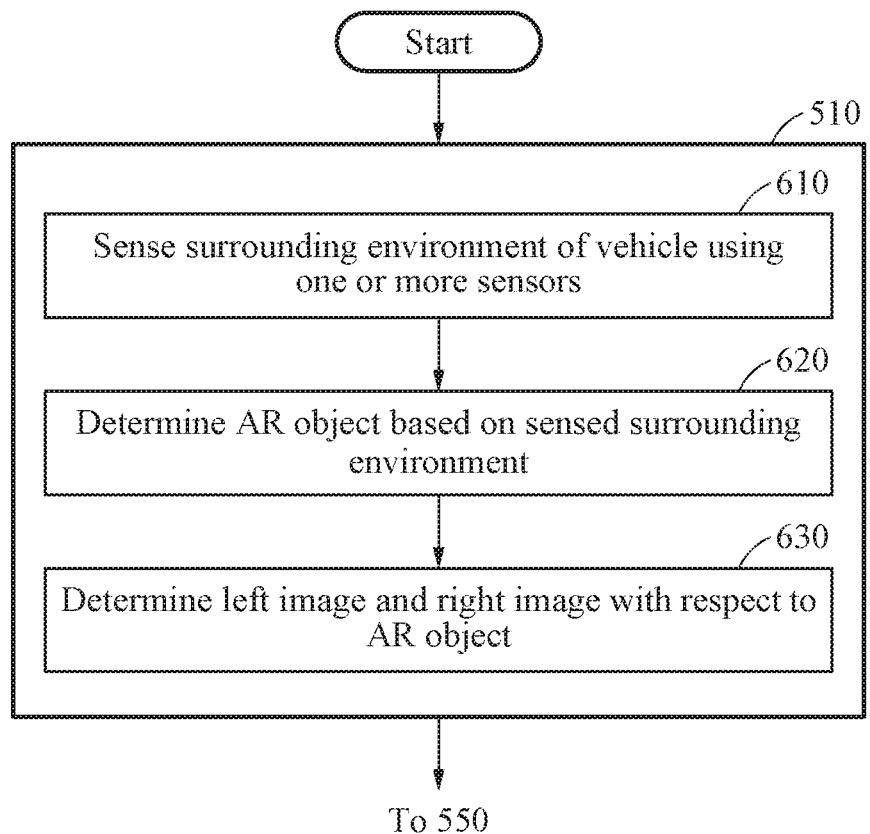
FIG. 6 is a flowchart illustrating an example of determining a left image and a right image for an AR object according to an example embodiment.

FIG. 6 is a flowchart illustrating an example of determining a left image and a right image for an AR object according to an example embodiment.

Operation 510 of FIG. 5 may include operations 610 to 630 described below.

In operation 610, the electronic device 400 senses a surrounding environment of a vehicle using one or more sensors. For example, the electronic device 400 may capture an image of the vicinity of the vehicle using a camera and detect lanes or neighboring objects in the captured image. In another example, the electronic device 400 may detect the neighboring objects using a radar or a Lidar. In still another example, the electronic device 400 may determine a GPS position of the vehicle using a GPS.

In operation 620, the electronic device 400 may determine an AR object based on the sensed surrounding environment. For example, an AR object for lane change and an AR object for velocity limit indication may be determined.

In operation 630, the electronic device 400 may determine a left image and a right image with respect to the AR object. For example, the left image and the right image with respect to the AR object may be preset.

Figure 7:
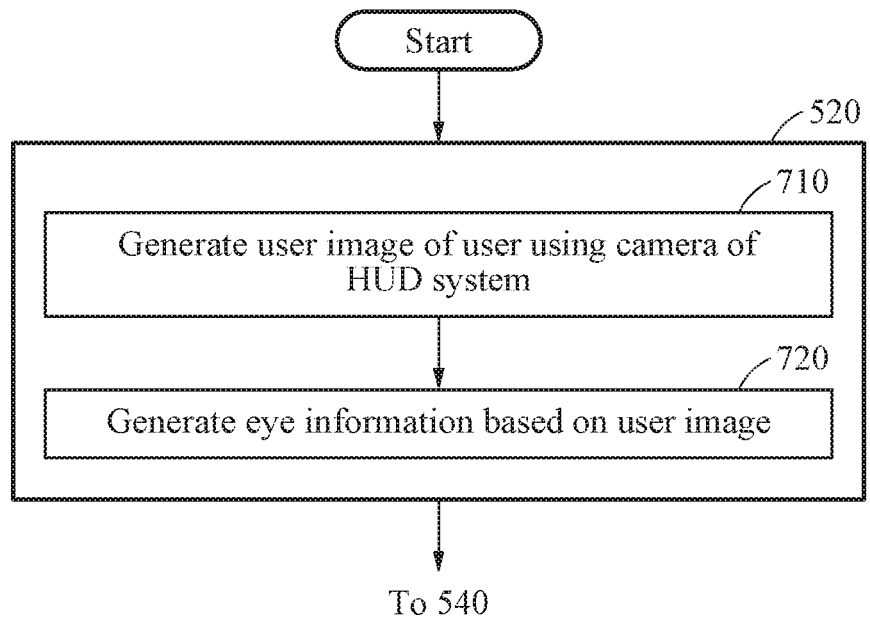
FIG. 7 is a flowchart illustrating an example of generating eye information of a user based on a user image according to an example embodiment.

FIG. 7 is a flowchart illustrating an example of generating eye information of a user based on a user image according to an example embodiment.

Operation 520 of FIG. 5 may include operations 710 and 720 described below.

In operation 710, the electronic device 400 generates a user image of a user using a camera of a HUD system. The user image may include both eyes of the user.

The user image may be continuously generated according to an operation clock of the camera. For example, if the camera operates at 60 frames per second (fps), 60 user images may be generated per second. The operation clock of the camera may vary depending on an internal environment of the vehicle. For example, if a camera configured to generate a color image operates in a dark environment, the camera may not operate with its maximum operation cycle since a time for receiving light is required. In another example, if the camera is an infrared camera, the camera may operate with its maximum operation cycle even in a dark environment. The generation of the user image is not limited to the examples described above.

In operation 720, the electronic device 400 generates eye information based on the user image. For example, coordinates of the left eye and the right eye in the user image may be determined, and the determined coordinates may be converted into a 3D coordinate system set with respect to the HUD system. The eye information may include the coordinates of the left eye and the right eye converted into the 3D coordinate system.

Figure 8:
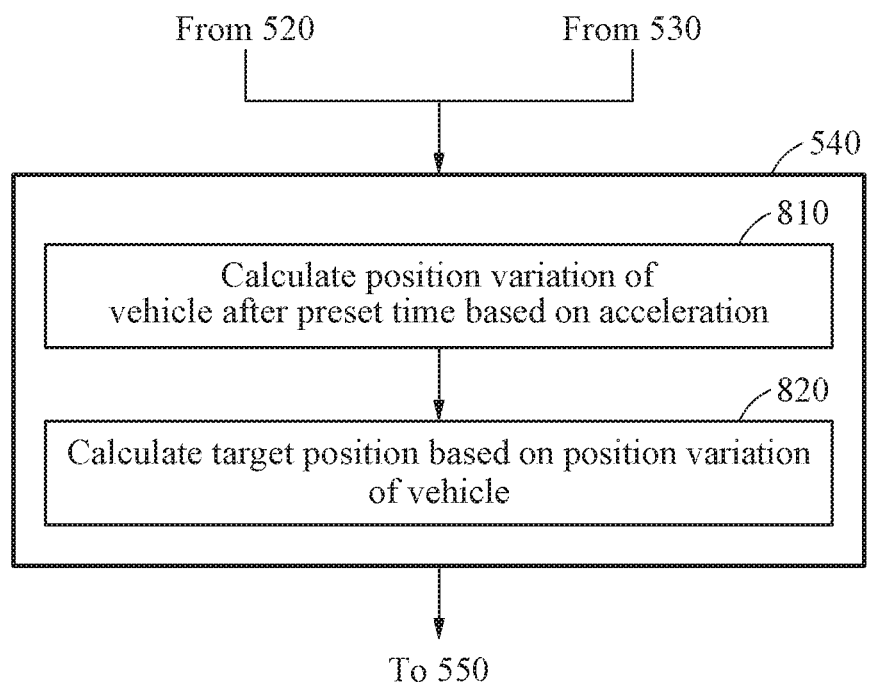
FIG. 8 is a flowchart illustrating an example of predicting a target position of a user after a preset time based on an acceleration and eye information according to an example embodiment.

FIG. 8 is a flowchart illustrating an example of predicting a position of a user after a preset time period based on an acceleration and eye information according to an example embodiment.

Operation 540 of FIG. 5 may include operations 810 and 820 described below.

In operation 810, the electronic device 400 calculates a position variation of the vehicle after a preset time period based on the measured acceleration. For example, the position variation of the vehicle may be calculated through Equation 1.

$$p(t + \Delta t) \cong p(t) + p'(t)\Delta t + \frac{1}{2!}p''(t)\Delta t^2 \qquad \text{[Equation 1]}$$

$$\Delta p = p(t + \Delta t) - p(t) = p'(t)\Delta t + \frac{1}{2!}p''(t)\Delta t^2$$

In Equation 1, p(t) denotes a position of the vehicle at a time t, and Δt denotes the preset time period. p(t+Δt) denotes the position of the vehicle at a point in time after the preset time period Δt elapses from t (that is, t+Δt). p(t+Δt) may be approximated by a 2nd order Taylor expansion. p'(t) and p''(t) respectively denote the velocity and the acceleration of the vehicle at the time t. The position variation of the vehicle for a preset time period (i.e., a difference between the position at time t and the position at time Δt) may be expressed by $$p'(t)\Delta t + \frac{1}{2!}p''(t)\Delta t^2.$$

That is, if Δt is preset as a constant, the position variation of the vehicle may be calculated by measuring the velocity p'(t) and the acceleration p''(t) of the vehicle at the time t.

Since the acceleration p''(t) at the time t may be measured using an IMU, the velocity p'(t) may be calculated based on the acceleration p''(t). For example, the velocity p'(t) may be calculated by integrating the acceleration p''(t).

The final position variation of the vehicle may be calculated by adjusting a weight for the velocity p'(t) and a weight for the acceleration p''(t). For example, the final position variation of the vehicle may be calculated through Equation 2.

$$\Delta p = ap'(t)\Delta t + \frac{1}{2!}bp''(t)\Delta t^2 \qquad \text{[Equation 2]}$$

In Equation 2, a denotes the weight for the velocity p'(t), and b denotes the weight for the acceleration p''(t).

In operation 820, the electronic device 400 calculates a target position of the user after the preset time period based on the position variation of the vehicle.

A force applied to the user changes depending on a direction of the acceleration applied to the vehicle, and thus a position variation of the user may not be equal to the position variation of the vehicle. Since the position variation of the user and the position variation of the vehicle are not the same, a relative displacement between the vehicle and the user occurs.

Further, if the position variation of the vehicle is also used as the position variation of the user, errors occurring during a process of generating the eye information of the user may be amplified.

The position variation of the user may be determined by adjusting a compensation ratio of the position variation of the vehicle. The compensation ratio may be determined differently with respect to each of the three axes. In other words, the position variation of the vehicle may be determined for each of a plurality of perpendicular axes. The compensation ratios that are applied to each of the respective position variations may be different from each other. For example, the compensation ratio with respect to each of the three axes may vary depending on the direction of the acceleration. In detail, since an acceleration generated by a velocity bump is in up and down directions, a compensation ratio for the directions may be determined to be great, and a compensation ratio for the other directions may be determined to be small.

The target position of the user may be calculated using Equation 3.

$$\widehat{x}_h(t) = x_h(t) + \alpha\Delta x \quad 0 \leq \alpha \leq 1$$

$$\widehat{y}_h(t) = y_h(t) + \beta\Delta y \quad 0 \leq \beta \leq 1$$

$$\widehat{z}_h(t) = z(t) + \gamma\Delta z \quad 0 \leq \gamma \leq 1 \qquad \text{[Equation 3]}$$

In Equation 3, $(x_h(t), y_h(t), z_h(t))$ denotes the position $p_h(t)$ of the user detected at the time t, (Δx, Δy, Δz) denotes the position variation $\Delta p_h$ of the vehicle after the time Δt, and ($\widehat{xh}(t), \widehat{yh}(t), \widehat{zh}(t)$) denotes the predicted target position $\widehat{ph}(t)$ of the user. α, β, and γ denote the compensation ratios for the respective axes x, y, and z. The detected position of the user and the predicted target position of the user may be expressed as the relative position of the user to the position of the vehicle.

Figure 9:
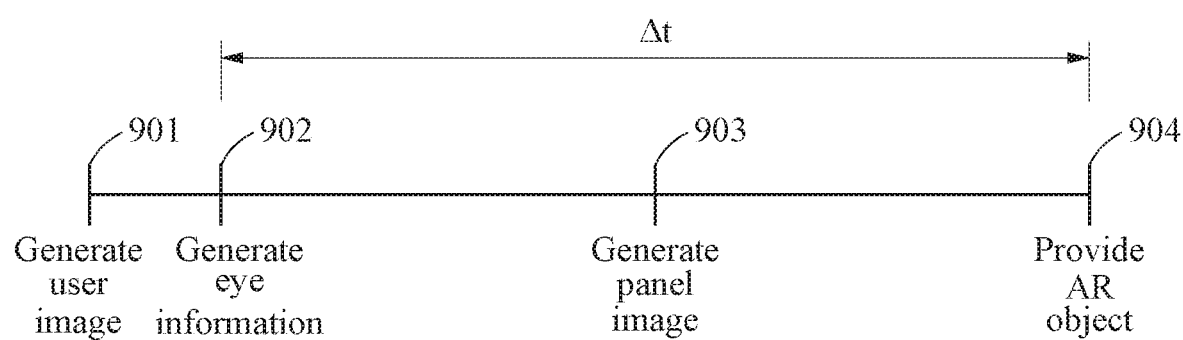
FIG. 9 illustrates a preset time according to an example embodiment.

FIG. 9 illustrates a preset time period according to an example embodiment.

A user image is generated at a first point in time 901, and eye information is generated at a second point in time 902 by processing the user image during a period between the first point in time 901 and the second point in time 902.

A panel image is generated at a third point in time 903 by rendering stereo images during a period between the second point in time 902 and the third point in time 903.

An AR object is provided to a user at a fourth point in time 904. The AR object is provided to the user based on the eye information generated at the second point in time 902. Thus, a movement of the user occurring during a period between the second point in time 902 and the fourth point in time 904 is not reflected in the AR object.

If the panel image is generated by predicting a movement of the user that will occur during the interval between the second point in time 902 and the fourth point in time 904 and reflecting the predicted movement, an appropriate AR object may be provided to the user. For example, the movement of the user that will occur during the interval between the second point in time 902 and the fourth point in time 904 may be predicted using the eye information generated at the second point in time 902 and the acceleration of the vehicle. For example, the preset time period may correspond to the interval between the second point in time 902 and the fourth point in time 904.

Figure 10:
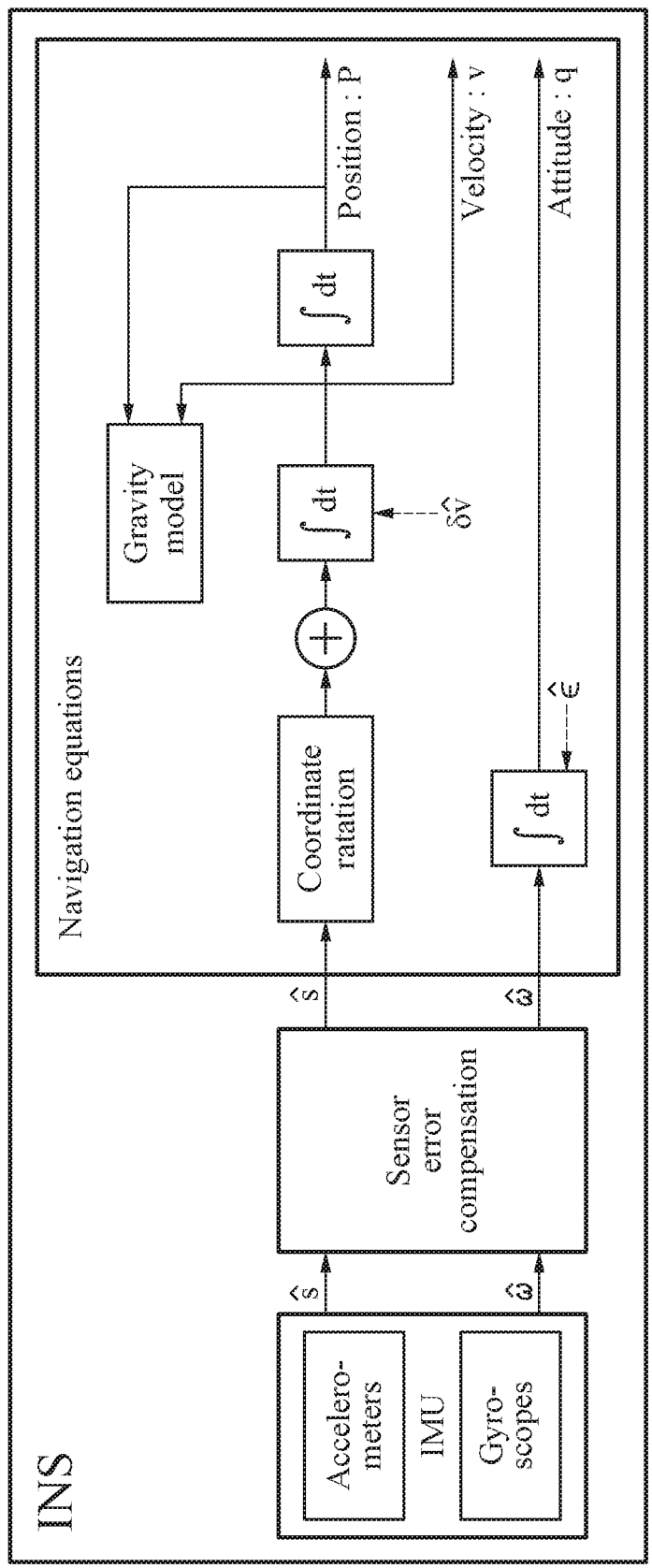
FIG. 10 illustrates an example of determining an acceleration, a velocity, and a position of a vehicle using an IMU according to an example embodiment.

FIG. 10 illustrates an example of determining an acceleration, a velocity, and a position of a vehicle using an IMU according to an example embodiment.

The electronic device 400 may calculate an attitude, a velocity, and a position of a vehicle based on an acceleration measured by an IMU. The electronic device 400 may operate an INS using the calculated attitude, velocity, and position of the vehicle.

The IMU may measure an acceleration $\hat{s}$ of the vehicle using accelerometers, and measure an angular acceleration $\hat{\omega}$ of the vehicle using gyroscopes. In addition, sensor errors of the measured acceleration $\hat{s}$ and angular acceleration $\hat{\omega}$ may be corrected.

The velocity v may be obtained by integrating the acceleration $\hat{s}$. Velocity errors may be reflected to obtain the velocity v. The position p of the vehicle may be obtained by integrating the velocity v. The position p may be a travel distance. A gravity model of the vehicle may be generated based on the velocity v and the position p.

The attitude q of the vehicle may be obtained by integrating the angular acceleration $\hat{\omega}$.

The INS for the vehicle may be operated using the attitude q, the velocity v, and the position p of the vehicle.

Figure 11:
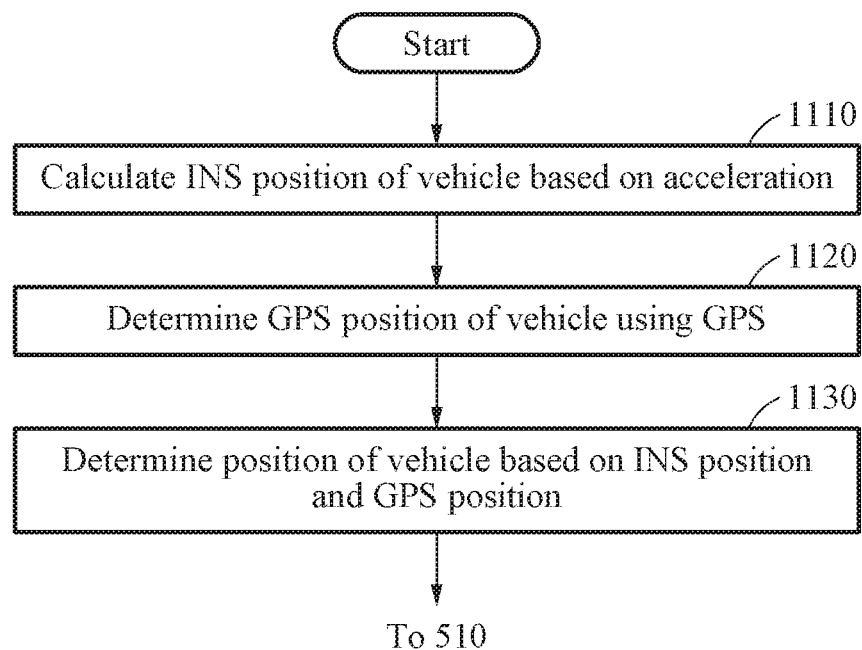
FIG. 11 illustrates an example of determining a position of a vehicle using a global positioning system (GPS) position according to an example embodiment.

FIG. 11 illustrates an example of determining a position of a vehicle using a GPS position according to an example embodiment.

Operations 1110 to 1130 described below may be performed before operation 510 of FIG. 5.

In operation 1110, the electronic device 400 calculates an INS position of the vehicle based on the acceleration.

In operation 1120, the electronic device 400 determines a GPS position of the vehicle using a GPS.

In operation 1130, the electronic device 400 determines the position of the vehicle based on the INS position and the GPS position. For example, the position of the vehicle may be determined by correcting the INS position using the GPS position.

Figure 12:
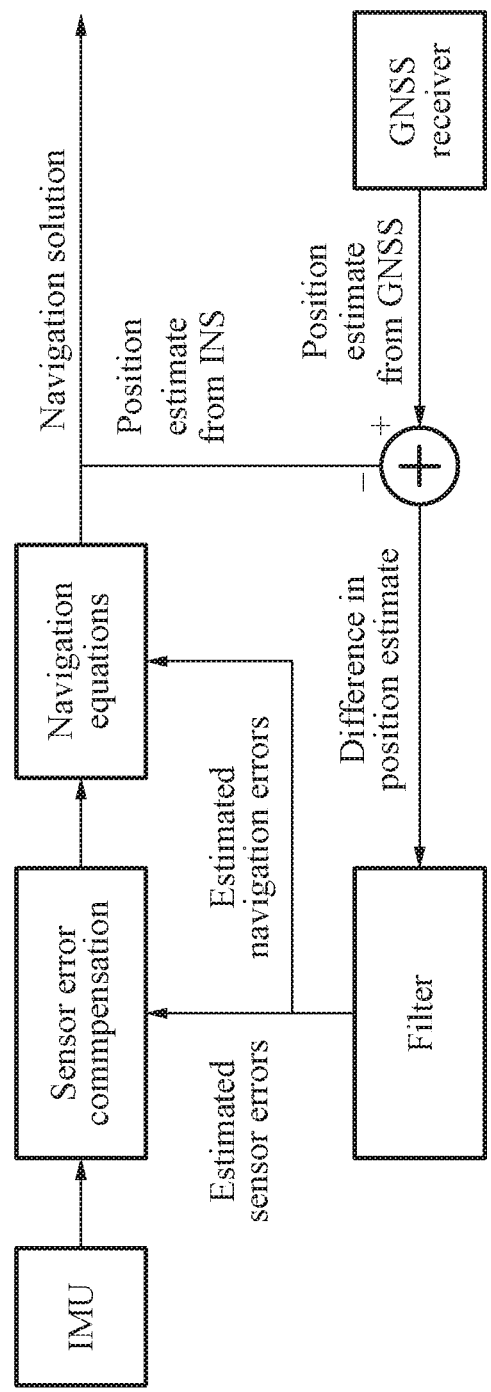
FIG. 12 illustrates an example of determining a position of a vehicle using an inertial navigation system (INS) position and a GPS position according to an example embodiment.

An example of determining the position of the vehicle will be shown in FIG. 12.

FIG. 12 illustrates an example of determining a position of a vehicle using an INS position and a GPS position according to an example embodiment.

A INS position of a vehicle may be calculated using an IMU. For example, estimated sensor errors and estimated navigation errors may be reflected to calculate the INS position.

A GPS position of the vehicle may be estimated using a global navigation satellite system (GNSS) receiver.

A difference between the INS position and the GPS position may be calculated, and a filter used to calculate the INS position may be corrected based on the difference. The filter may adjust the estimated sensor errors and the estimated navigation errors of the vehicle.

Figure 13:
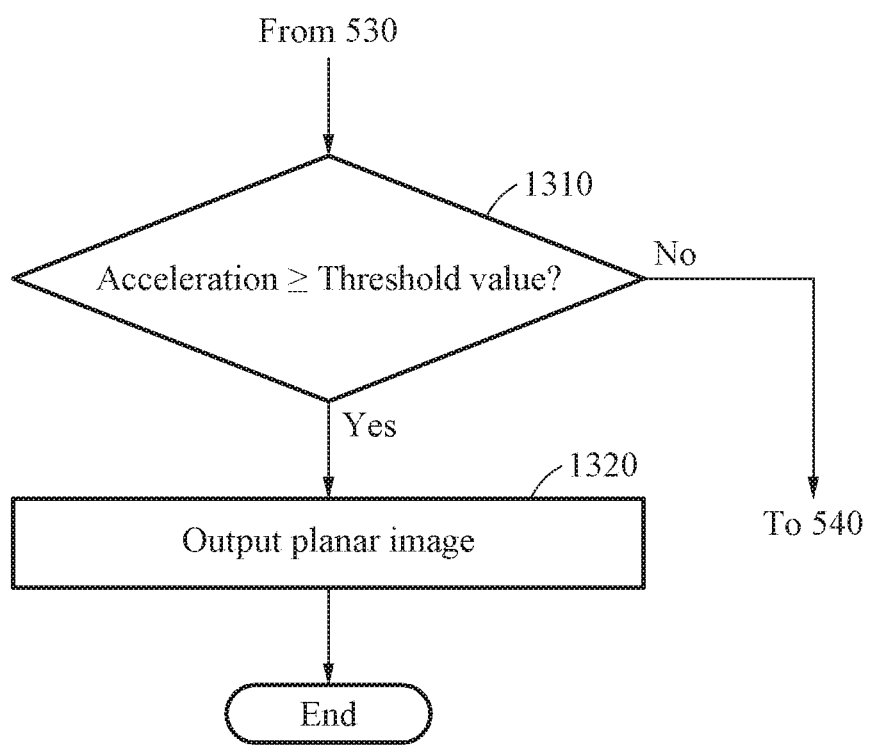
FIG. 13 is a flowchart illustrating an example of providing a planar image instead of an AR object based on a magnitude of an acceleration according to an example embodiment.

FIG. 13 is a flowchart illustrating an example of providing a planar image instead of an AR object based on a magnitude of an acceleration according to an example embodiment.

Operations 1310 and 1320 described below may be performed after operation 530 of FIG. 5 is performed.

In operation 1310, the electronic device 400 determines whether the measured acceleration is greater than or equal to a threshold value.

In operation 1320, the electronic device 400 outputs a planar image instead of a 3D AR object if the acceleration is greater than or equal to the threshold value. A state in which the acceleration is greater than or equal to the threshold value may be determined to be an environment where it is difficult to normally provide a 3D AR object to the user. In such an environment, the electronic device 400 may provide a 2D planar image to the user.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of providing an augmented reality (AR) object, the method comprising:

determining a left image and a right image to provide an AR object to a user of a vehicle;
generating eye information of the user based on an image of the user that is obtained;
measuring an acceleration of the vehicle using an inertial measurement unit;
predicting a target position of the user a preset time period after the image of the user is obtained, based on the acceleration and the eye information;
generating a panel image by rendering the left image and the right image based on the predicted target position; and
providing the AR object to the user by outputting the panel image through a head-up display (HUD) system of the vehicle,
wherein the predicting of the target position of the user comprises:
determining a position variation of the vehicle after the preset time period based on the acceleration; and
determining the target position of the user based on the position variation of the vehicle and the eye information.

2. The method of claim 1, wherein the determining of the left image and the right image comprises:
sensing a surrounding environment of the vehicle using one or more sensors;
determining the AR object based on the sensed surrounding environment; and
determining the left image and the right image with respect to the AR object.

3. The method of claim 1, wherein the generating of the eye information of the user comprises:
obtaining the image of the user using a camera of the HUD system; and
generating the eye information based on the image of the user.

4. The method of claim 3, wherein the eye information comprises relative position information between the HUD system and both eyes of the user.

5. The method of claim 1,
wherein the position variation of the vehicle comprises a difference between a first position of the vehicle at a start of the preset time period and a second position of the vehicle at an end of the preset time period.

6. The method of claim 1, wherein the determining of the target position of the user based on the position variation of the vehicle comprises:
determining respective position variations of the vehicle with respect to a plurality of perpendicular axes;
determining respective compensation ratios for each of the plurality of perpendicular axes based on the respective position variations of the vehicle; and
determining the target position based on the compensation ratios for each of the plurality of perpendicular axes.

7. The method of claim 1, wherein the generating of the panel image comprises:
generating the panel image using at least one parameter with respect to the HUD system.

8. The method of claim 1, wherein the preset time period corresponds to a difference between a first point in time at which the eye information is generated and a second point in time at which the panel image is output.

9. The method of claim 1, further comprising:
determining an inertial navigation system (INS) position of the vehicle based on the acceleration;
determining a global positioning system (GPS) position of the vehicle using a GPS; and
determining a position of the vehicle based on the INS position and the GPS position,
wherein the position of the vehicle is used to determine the AR object provided to the user of the vehicle.

10. The method of claim 1, further comprising:
determining whether the measured acceleration is greater than or equal to a preset threshold value; and
providing a planar image to the user as the AR object through the HUD system of the vehicle in response to the measured acceleration being greater than or equal to the preset threshold value.

11. A non-transitory computer-readable storage medium storing instructions that, when executed by a processor, cause the processor to perform the method of claim 1.

12. An electronic device comprising:
a memory configured to store a program to provide an augmented reality (AR) object to a user of a vehicle; and
a processor configured to execute the program to:
determine a left image and a right image to provide an AR object to the user,
generate eye information of the user based on an image of the user that is obtained,
measure an acceleration of the vehicle using an inertial measurement unit,
determine a position variation of the vehicle after a preset time period after the image of the user is obtained based on the acceleration,
determine a target position of the user based on the position variation of the vehicle and the eye information,
generate a panel image by rendering the left image and the right image based on the predicted target position, and
provide the AR object to the user by outputting the panel image through a head-up display (HUD) system of the vehicle.

13. The electronic device of claim 12, wherein the processor is further configured to execute the program to:
obtain the image of the user using a camera of the HUD system, and
generate the eye information based on the image of the user.

14. The electronic device of claim 13, wherein the eye information comprises relative position information between the HUD system and both eyes of the user.

15. The electronic device of claim 12,
wherein the position variation of the vehicle comprises a difference between a first position of the vehicle at a start of the preset time period and a second position of the vehicle at an end of the preset time period.

16. The electronic device of claim 12, wherein the processor is further configured to execute the program to:
determine the position variation of the vehicle with respect to a plurality of perpendicular axes;
determine respective compensation ratios for each of the plurality of perpendicular axes based on the respective position variations of the vehicle; and
determine the target position based on the determined compensation ratios for each of the plurality of perpendicular axes.

17. The electronic device of claim 12, wherein the preset time period corresponds to a difference between a first point in time at which the eye information is generated and a second point in time at which the panel image is output.

18. The electronic device of claim 12, wherein the processor is further configured to execute the program to:

determine whether the measured acceleration is greater than or equal to a preset threshold value; and provide a planar image to the user as the AR object through the HUD system of the vehicle in response to the measured acceleration being greater than or equal to the preset threshold value.

19. The electronic device of claim 12, wherein the electronic device is included in the vehicle.

* * * * *